(12) United States Patent
Almhill et al.

(10) Patent No.: US 9,975,495 B2
(45) Date of Patent: May 22, 2018

(54) LOAD CARRIER FOOT

(71) Applicant: Thule Sweden AB, Hillerstorp (SE)

(72) Inventors: Stefan Almhill, Taberg (SE); Markus Nordangård, Värnamo (SE); Claes Johansson, Åsenhöga (SE)

(73) Assignee: Thule Sweden AB, Hillertorp (SE)

( * ) Notice: Subject to any disclaimer, the term of this patent is extended or adjusted under 35 U.S.C. 154(b) by 0 days. days.

(21) Appl. No.: 15/111,714

(22) PCT Filed: Feb. 6, 2015

(86) PCT No.: PCT/EP2015/052473
§ 371 (c)(1),
(2) Date: Jul. 14, 2016

(87) PCT Pub. No.: WO2015/118091
PCT Pub. Date: Aug. 13, 2015

(65) Prior Publication Data
US 2016/0332581 A1    Nov. 17, 2016

(30) Foreign Application Priority Data
Feb. 7, 2014 (EP) .................... 14154331

(51) Int. Cl.
*B60R 9/058* (2006.01)
(52) U.S. Cl.
CPC .................. *B60R 9/058* (2013.01)
(58) Field of Classification Search
CPC ................ B60R 9/058; B60R 9/052
See application file for complete search history.

(56) References Cited

U.S. PATENT DOCUMENTS

| | | | |
|---|---|---|---|
| 5,366,128 A * | 11/1994 | Grim | B60R 9/058 224/322 |
| 2012/0228348 A1* | 9/2012 | Aftanas | B60R 9/058 224/309 |
| 2013/0193177 A1* | 8/2013 | Poulsen | B60R 9/058 224/329 |
| 2015/0321618 A1* | 11/2015 | Almhill | F16M 13/02 224/331 |
| 2015/0353023 A1* | 12/2015 | Schierk | B60R 9/058 224/331 |

FOREIGN PATENT DOCUMENTS

| | | |
|---|---|---|
| DE | 10 2011 053604 | 3/2013 |
| EP | 2 426 013 | 3/2012 |

OTHER PUBLICATIONS

International Search Report and Written Opinion of the International Searching Authority for International Appl. No. PCT/EP2015/052473, European Patent Office, Rijswijk, Netherlands, dated Mar. 4, 2015, 7 pages.

* cited by examiner

*Primary Examiner* — Corey Skurdal
(74) *Attorney, Agent, or Firm* — Sterne, Kessler, Goldstein & Fox P.L.L.C.

(57) ABSTRACT

A load carrier foot of clamping type includes a tensioning arrangement. The tensioning arrangement includes a cam member and a separate lever. The lever can be operated to pivot the cam member to impart a clamping force to retain the load carrier foot. The lever or a separate release member can be used pivot back the cam member to detach the load carrier foot.

17 Claims, 18 Drawing Sheets

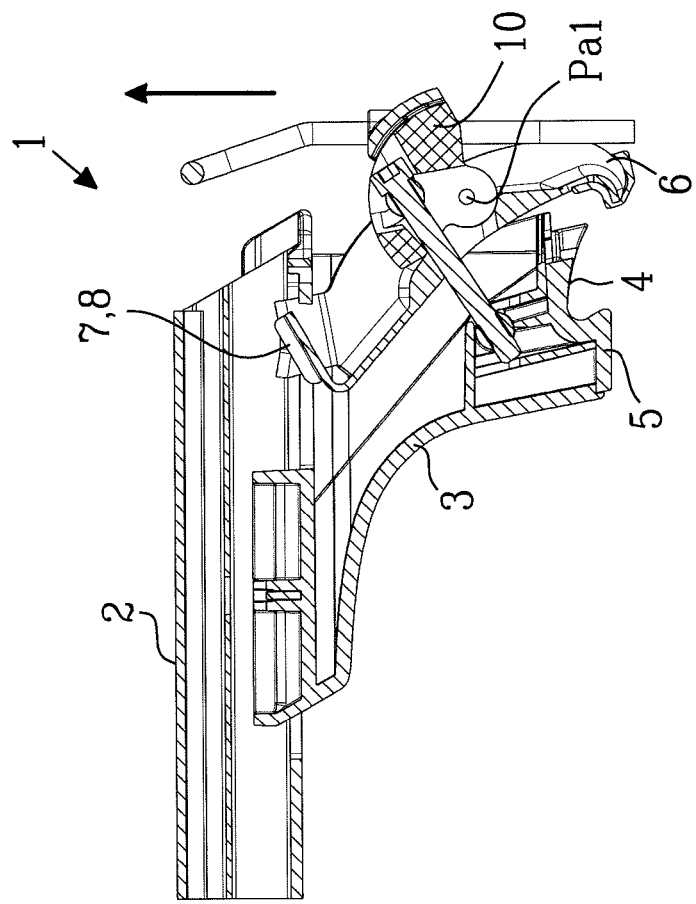
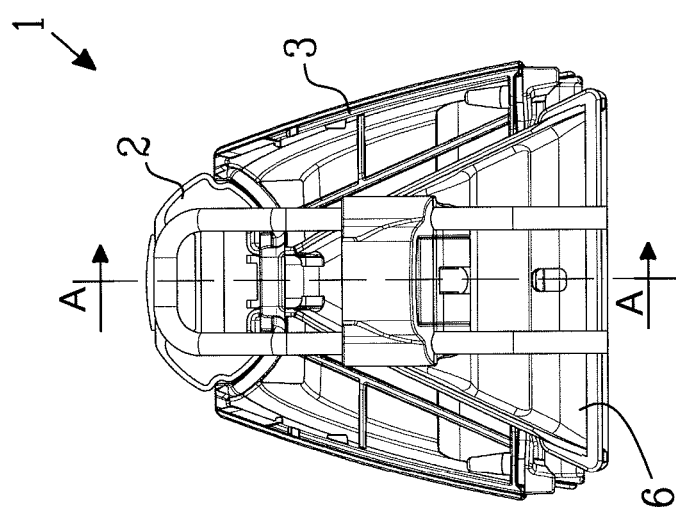

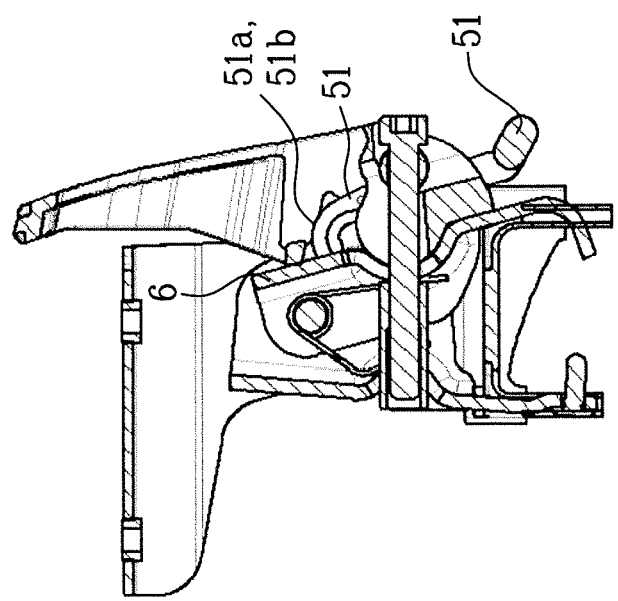
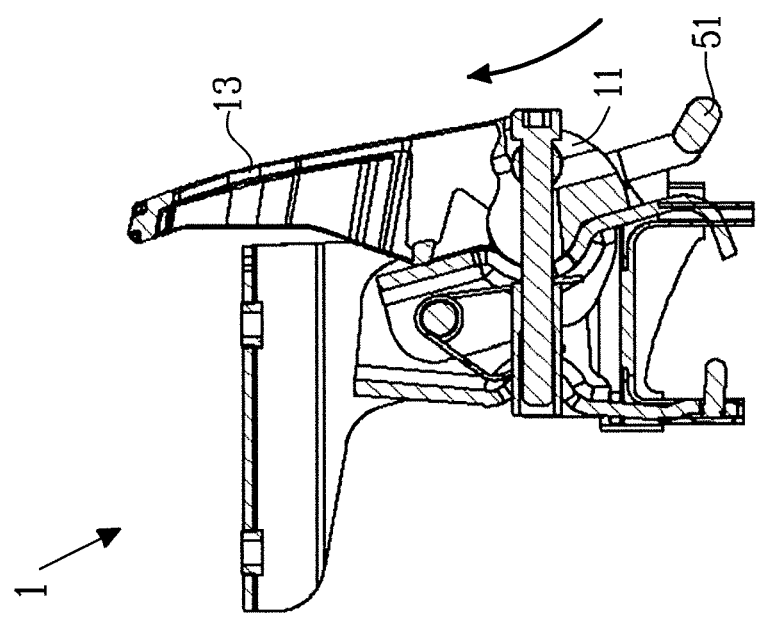

LOAD CARRIER FOOT

TECHNICAL FIELD

A load carrier foot of clamping type comprising a support surface, a bracket and a tensioning arrangement to impart a clamping force between the support surface and the bracket. The tensioning arrangement comprises a lever and can be operated by a user using his/hers hands.

BACKGROUND

Roof racks for vehicles are during use exposed to very harsh environmental conditions such as rain, snow, wind, dirt and the like. They are further expected to withstand a limited amount of crash violence, e.g. from a colliding vehicle. These requirements restrict the materials selected, the shape and the form of the roof rack and its components.

A roof rack generally has a first and a second load carrier foot and a load carrying bar extending there between. It is of utter importance that the load carrier feet are mounted and attached correctly to the vehicle roof. As a consequence, different types of load carrier feet have been developed. One type of load carrier foot is a fix-point load carrier foot. A fix-point load carrier foot uses fixed positions on the vehicle roof to attach the load carrier foot. Usually a nut welded to the vehicle roof, or welded to the vehicle roof chassis, serves as a fix-point for a fix-point load carrier foot. A draw back with a fix-point load carrier foot is of course the limited amount of available positions at which the load carrier foot can be positioned.

Another type of load carrier foot is a load carrier foot of clamping type. Such a load carrier foot uses clamping force between a support surface and a bracket as main attachment principle. An advantage with these type of load carrier feet is that they can be positioned in a plurality of different positions, generally along a rail arranged on the roof of the vehicle. The German patent application no. DE 10 2011 053 604 A1, JAC Products Europe Gmbh, disclose a load carrier foot of clamping type having a support body with a support surface adapted to rest against a first surface of the vehicle, and a portion which the load carrying bar is attached to. A bracket, adapted to grip about a second surface of the vehicle, and a tensioning arrangement adapted to impart a clamping force between the first and the second surface of the vehicle. The tensioning arrangement comprises a lever with an integrated cam member which a user can pivot to impart the clamping force. The cam operates against a portion of the support body.

Load carrier feet of clamping types are susceptible to some drawbacks. One drawback is that they generally tend to use friction provided by the clamping force to rely on a sturdy attachment to the vehicle rail, or vehicle roof. There is also the risk of a load carrier foot of clamping type not being mounted correctly. The ease of which a load carrier foot can be mounted and the semantics which it projects to a user are important factors to reduce the risk to mount a load carrier foot of clamping type incorrectly. There is always a need for load carrier foot which can withstand a high amount of crash violence, i.e. which are readily attached to the vehicle.

Further, using tools has long been considered less favorable when mounting load carrier feet. Tools are not always at hand, and tools further increase the risk of tightening e.g. a screw on a load carrier foot to tight. It is thus advantageous to provide a load carrier foot which can be operated by a user using his/hers hands as a complement or replacement to tools.

SUMMARY

An objective of the present invention is to at least reduce the drawbacks of the known prior art, or to at least provide for a useful alternative thereto. The objective is at least partly met by a load carrier foot comprising a support body comprising a support surface adapted to rest against a first surface of a vehicle, a bracket adapted to grip about a second surface of the vehicle and a tensioning arrangement adapted to impart a clamping force to the bracket to retain the load carrier foot to the vehicle.

The tensioning arrangement comprises a cam member adapted upon pivoting of the cam member to impart the clamping force to the bracket. The tensioning arrangement further comprises a lever in working cooperation with the cam member. The lever is operable by a user to pivot the cam member.

The lever is a separate component with respect to the cam member. It can be positioned adjacent the cam member or be separated via a washer or the like. By having the lever separately from the cam member, i.e. the cam member is a separate component even if positioned adjacent the cam member. The tensioning arrangement becomes very user friendly and semantic in its function in terms of that a user can easily understand how the load carrier foot is attached and detached. The solution permits the lever, if desired, to pivot the cam member to impart the required clamping force, and thereafter be pivoted back to its original position, e.g. a storage position. The cam member does not need to follow the lever back to the levers original position as the lever and the cam members are separate components and made to pivot separately.

According to an aspect, the lever is operable between a first and a second position, wherein when the lever is displaced from the first position to the second position, the cam member is pivoted together with the lever.

The cam member can be configured to be pivoted when the lever is pivoted from a storage position to a tightened position. The lever can also be configured to be pivoted to the storage position without pivoting the cam member, or to be pivoted back to the storage position without pivoting the cam member from its tightened position.

The lever may engage the cam member in different ways e.g. via a bar or a protrusion arranged on the lever and adapted to cooperate with a portion of the cam member such as a ledge or a groove, or the walls defined by the groove.

The lever can be pivotally attached to the cam member. In an embodiment, the lever is connected to the cam member via a separate connection axle. As an option, the lever and the cam member can be connected by being coupled together without separate connection members. The lever can be connected via protrusions extending from the cam member for example, or visa verse.

According to an aspect, the cam member is configured to pivot about a first pivot axis and the lever is configured to pivot about the same first pivot axis. As an option, the cam member can be configured to pivot about a first pivot axis and the lever can be configured to pivot about the same first pivot axis, at least when the lever is pivoted from a storage position to a tightened position. This makes the pivot force which the user imparts to the cam member easy to transfer to a translational displacement.

The lever advantageously extends in a radial direction with respect to the first pivot axis. In a sense, the lever extends in a direction from the pivot axis in a radial direction away from the pivot axis. In an embodiment, the extension of the lever is displaced from a radial direction. The lever can be extending in a direction offset to a radial direction.

The tensioning arrangement can operate on the bracket in different manners. The tensioning arrangement can comprise an elongated member, such as a screw, pivotally connected to the support body, or to a second bracket arranged to the load carrier foot. The second bracket is preferably pivotally connected to the support body. The cam member is provided with a knee joint type of connection which enables the bracket, or brackets if the load carrier foot comprises two brackets, to be separated with respect to each other so that the load carrier foot is easy to mount on the vehicle.

In cases where a screw is used, the screw preferably extends through an aperture of the bracket. The screw is advantageously pivotally connected to the cam member. The screw should be connected to the cam member so that the screw is permitted to pivot when the tensioning arrangement is not in a tightened configuration. This will permit the load carrier foot to be easily attached and detached form the vehicle.

The bracket comprises can comprise a cam member receiving cavity and/or a ridge, providing a cam member receiving surface on the bracket. The cam member receiving surface can be formed by the bracket itself or by a separate piece of material attached to the bracket.

The lever can further be made extendable in a telescopic or foldable manner. The lever can in an embodiment be extendable and retractable between an extended position, in which the lever is operable, and a retracted storage position. It should be noted that the feature of an extendable lever can be used separately and independently of the features described herein together with a load carrier foot of clamping type. A load carrier foot comprising a support body comprising a support surface adapted to rest against a first surface of a vehicle, a bracket adapted to grip about a second surface of the vehicle and a tensioning arrangement adapted to impart a clamping force to the bracket to retain the load carrier foot to the vehicle. The tensioning arrangement comprises a cam member adapted upon pivoting of the cam member to impart the clamping force to the bracket. The tensioning arrangement further comprises an extendable lever adapted to be pivoted about a pivot axis to pivot the cam member, wherein the lever is extendable in a directed substantially perpendicular to the pivot axis.

The cam member can operate as an eccentric, or a knee joint. The cam member has a cam surface with a radial curvature or an eccentric curvature. By an eccentric curvature is hereby meant a curvature or a form which assists in translating the pivotal motion of the lever to a forward motion against the bracket. During detachment, the displacement of the cam member back with a counter pivot motion, the pivotal motion of the cam member is released from being clamped against the bracket, i.e. translated to a backward motion with respect to the bracket.

The load carrier foot can comprise one or more brackets, or grip arms, which cooperates with the tensioning arrangement. If the above mentioned bracket is a first bracket, the load carrier foot can comprise a second bracket. The second bracket can be pivotally connected to the support body and/or to the first bracket. An embodiment in which the first and the second brackets are pivotally connected to the support body of the load carrier foot is found advantageous as it will require few components to assemble the load carrier foot and it will permit the first and the second brackets to support each other by permitting them to be positioned adjacent each other, and optionally the support body.

A biasing member, such as a spring e.g. a helical spring, can be positioned between the first and the second brackets. It should be noted that the feature of a biasing member can be used separately and independently of the features described herein together with a load carrier foot of clamping type. A load carrier foot comprising a support body comprising a support surface adapted to rest against a first surface of a vehicle, a first bracket adapted to grip about a second surface of the vehicle, a second bracket adapted to grip about a third surface of the vehicle, and a tensioning arrangement adapted to impart a clamping force between the first and the second brackets to retain the load carrier foot to the vehicle. The load carrier foot further comprises a biasing member, such as a spring, preferably a helical spring, positioned between the first and the second brackets and adapted to bias the first and the second bracket apart.

The biasing member strives towards separating the first and the second brackets apart. The first and the second brackets are described herein as to form a gap between the end of the first and the second brackets; the biasing member strives towards keeping the gap open. This makes the load carrier foot easy to mount onto a rail of a vehicle for example.

It is advantageous if the first and the second brackets are connected via one common axle, and that the common axle extends through the spring, i.e. through the helical structure formed by a helical spring. This is very space efficient way of constructing the load carrier foot.

The tensioning arrangement can comprise a release member adapted to displace the cam member from a tightened position to a release position. The release member can be integrally formed with the lever or be a separate member therefrom. Even if integrally formed with the lever, or formed by a separate member with respect to the lever it is advantageous is the release member and the lever is adapted to pivot about the same pivot axis to tighten and release the cam member. The release member can thus share a pivot axis with the cam member and/or the lever.

The release member can be a separate member with respect to the cam member.

A user friendly configuration is when the release member and the lever are adapted to be pivoted about a pivot axis, wherein the release member has a release action upon being pivoted about the pivot axis. The release member is thus configured to release the cam member upon being pivoted about the pivot axis.

The release member can be provided with an accentuated surface for receiving one or more finger tips from a user, on which the user may press the release member to release the cam member. It is thus provided with a dedicated surface or area on which is visually and/or tactile indicating to the user that this is the area to press or pull to operate the release member.

The release member can be shorter than the lever. As the amount of force required to tighten the cam member generally is higher than the required force to release the cam member, the length of the release member can be shorter than the length of the lever. The length can be measured from the pivot point, or pivot axle, and the length of the leverage arm formed by the lever and release member respectively.

The lever can be provided with an opening or aperture formed in the lever to receive the release member, at least when the lever is positioned in a storage position. This is a compact way of position the lever and the release member, while still maintaining good semantics and user friendly arrangement.

The present invention also relates to a roof rack comprising at least one load carrier foot as described herein. It also relates to a roof rack comprising a first and a second load carrier foot, as described herein, or according to any one of the appended claims, and a load carrying bar extending between the first and the second load carrier foot.

In general terms, the present invention relates to load carrier foot of clamping type comprising a tensioning arrangement. The tensioning arrangement comprises a cam member and a separate lever. The lever can be operated to pivot the cam member to impart a clamping force to retain the load carrier foot. Optionally, the lever is used as release mechanism to pivot back the cam member, or a separate release member can be used pivot back the cam member to detach the load carrier foot.

BRIEF DESCRIPTION OF THE DRAWINGS

Non-limiting embodiments of the present invention will be described in greater detail with reference to the accompanying drawings in which;

FIG. 1a shows a load carrier foot according to a first embodiment with a view along the load carrying bar and towards the tensioning arrangement;

FIG. 1b shows the load carrier foot of FIG. 1a with a cross sectional view along A-A;

FIG. 14a shows the load carrier foot of FIG. 12 in a cross sectional view and with the release member in an unlocked position;

FIG. 14b shows the load carrier foot of FIG. 12 in a cross sectional view and with the release member in a locked position and;

DETAILED DESCRIPTION OF PREFERRED EMBODIMENTS

Figure 2A:
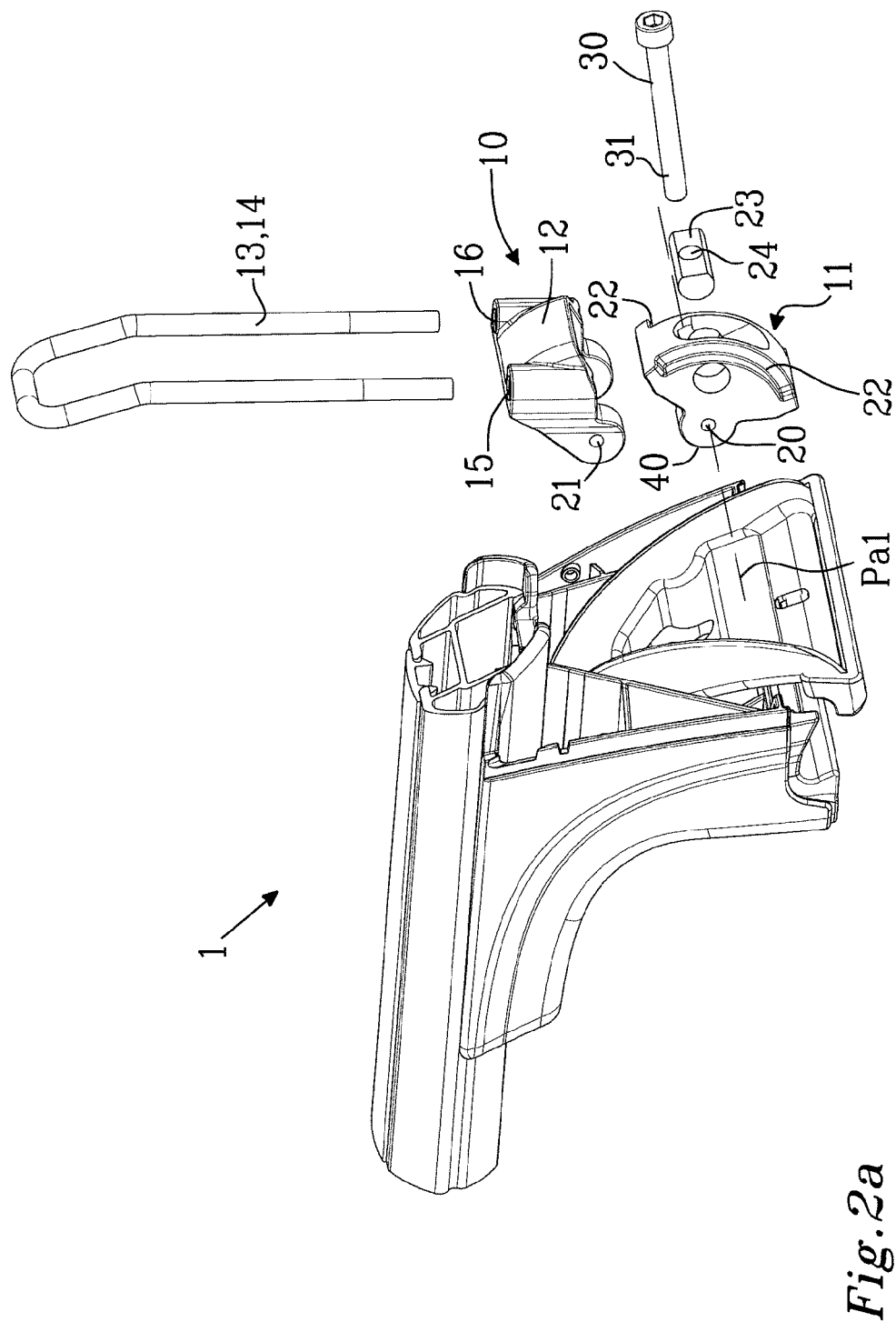
FIG. 2a shows the load carrier foot of FIG. 1a with a partly exploded view.

FIGS. 1a-1b show a load carrier foot 1 and parts of a load carrying bar 2. FIG. 1b is a cross sectional view from the side along A-A of FIG. 1a. With reference to both FIGS. 1a and 1b, the load carrier foot 1 comprises a support body 3 to which the load carrying bar 2 is arranged. The support body 3 further comprises a support surface 4 adapted to rest against a first surface of a vehicle (not shown). The vehicle can be an automobile such as a car, a lorry or the like. The first surface of the vehicle can be a rail, or any directly onto the roof, or any other suitable surface of the vehicle. The support surface 4 can be formed by an individual support member 5 as in the shown embodiment, or it can be integrally formed with the support body 3. A support member, like the support member 5 is preferably manufactured from a tough but lenient material having some elasticity and which is slightly compressible. A suitable material is rubber or a rubber like material, a thermoplastic material such as a polypropylene, or polyethylene based material. It is intended to provide for an increased friction between a support body of the load carrier foot, and the vehicle, e.g. a rail or the vehicle roof. It is further intended to prevent the rail or the vehicle roof from damage through tear and wear. The shown embodiment in FIGS. 1a-1b has an extendable lever, adapted to be pivoted about a pivot axis Pa1, wherein the lever is extendable in a directed substantially perpendicular to the pivot axis Pa1. The direction of extension is indicated in FIG. 1b with an arrow.

A bracket 6, or grip arm, is adapted to cooperate, e.g. grip about, a second surface of the vehicle, to retain the load carrier foot 1 to the vehicle. A tensioning arrangement 10 is adapted to impart the bracket 6 with a force so that a clamping force is formed between the bracket 6 and the support surface 4 enabling them to cooperate in a clamping manner to retain the load carrier foot 1 to the vehicle. The bracket 6 can be pivotally attached to the support body 3 or be configured with a flange 7 arranged on the upper end 8 of the bracket 6 which is adapted to grasp bout a portion of the support body 3, or the interior of the load carrying bar 2, to counter the imparted clamping force by the tensioning arrangement 10.

FIG. 2a shows the load carrier foot 1 in a partly exploded view, and more precisely the tensioning arrangement 10 in exploded view. The tensioning arrangement 10 comprises a cam member 11, a connection member 12 and a lever 13. It should be noted that the connection member 12 and the lever 13 can be integrally formed or formed by individual components as disclosed herein. The lever 13 is formed by a bent rod 14 having a circular cross section. The connection member 12 comprises a first and a second lever receiving aperture 15, 16 through which the rod 14 can be slideably displaced between an operable position and a storage position.

The cam member 11 is operating as an eccentric and is intended to press or brace against the bracket 6 to impart the clamping force. The cam member 11 has axle receiving aperture 20 adapted to receive an axle forming a first pivot axis Pa1 to the cam member 11. The axle receiving aperture 20 is positioned substantially at one end of the cam member 11 and aligned with an axle receiving aperture 21 of the lever connection member 12 so that the cam member 11 and the lever connection member 12 can be pivotally connected to each other. The connection member 12 is configured to partly encompass the cam member 11 on both sides of the cam member 11. The cam member 11 further comprises grooves 22 in which protrusions (shown in FIG. 2b) of the connection member 12 are adapted to slide between two end positions. It should be noted that only one of the groves 22 is fully visible in FIG. 2a. The cam member 11 can be provided with only one such groove if desired. The grooves 22 have arc shaped extension corresponding to the arced shape defined by the pivot motion along which the protrusions can slide. A pin 23 with an aperture 24 is connected to the cam member 11 via an aperture extending parallel with the first pivot axis Pa1. The aperture 24 of the pin 23 is adapted to receive a screw 30 making the screw 30 pivotally connected to the cam member 11. The screw 30 comprises a threaded end 31 and a head 32. The threaded end 31 is adapted to be threadably engaged with the support body 3 via a similar pin to the pin 23.

The cam member 11 comprises a cam surface 40, or eccentric surface, adapted to brace against a surface of the bracket 11. The cam surface 40 has a convex form with respect to the first pivot axis Pa1, preferably having a radius-, oval, or eccentric curvature. In the shown embodiment, the curvature is a radius curvature. The eccentric mechanism is provided by a knee-joint connection which the pivotable screw 30 is providing together with the cam member 11.

Figure 2B:
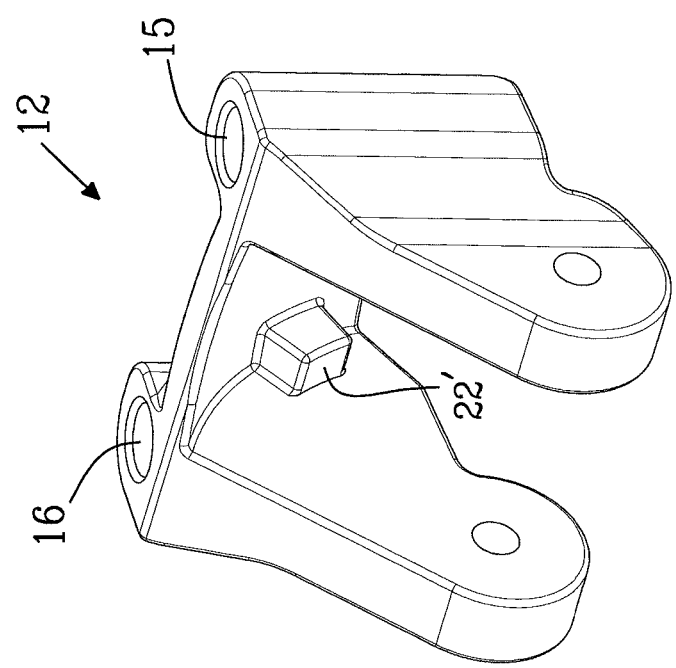
FIG. 2b shows a connection member of the tensioning arrangement of the load carrier foot of FIG. 1a in greater detail.

FIG. 2b shows the connection member 12 in greater detail. FIG. 2b shows the first and the second lever receiving apertures 15, 16 through which the rod 14 can be slideably displaced between an operable position and a storage position. One of two protrusions 22' adapted to cooperate with the groove 22 arranged on the cam member 11.

To operate the tensioning arrangement of the embodiment shown in FIGS. 1a-2a, a user pivots the lever 13 downwards to position the lever 13 in a tightened position. When the lever 13 is pivoted, the cam member 11 pivots with the lever 13 so that the cam member 11 imparts a force to the bracket 6 acting to decrease the distance between the bracket 6 and the support surface 4 of the support body 3, so as to retain the load carrier foot 1 to e.g. a rail of the vehicle. When the user has pulled the lever 13 downwards and the cam member 11 has tightened the bracket 6, the user can return the lever 13 to the storage position as shown in FIG. 1b. The cam member 11 however remains in a tightened position. To release the cam member 11 from the tightened position so that the load carrier foot 1 can be dismounted, the lever 13 is pushed in a counter clock wise direction, i.e. in an opposite direction as when the lever was pushed to the tightened position. The lever 13, via the connection member 12, displaces the cam member 11 from the tightened position. Hence in a general manner, the lever 13 can be used to release the cam member from a tightened position by counter pivoting the lever as compared to when tightening the cam member 11.

Figure 3A:
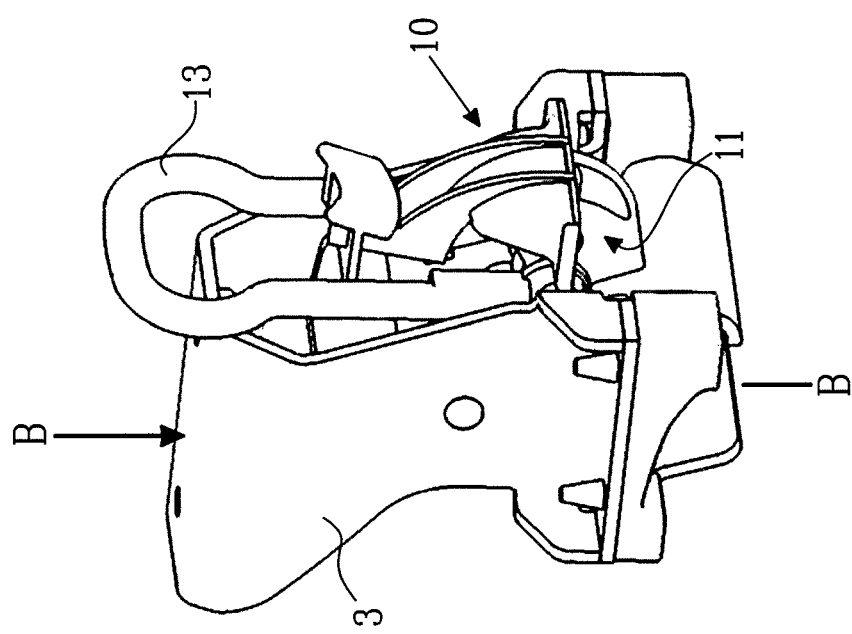
FIG. 3a shows a load carrier foot according to a second embodiment of the present invention with a perspective view.
Figure 3B:
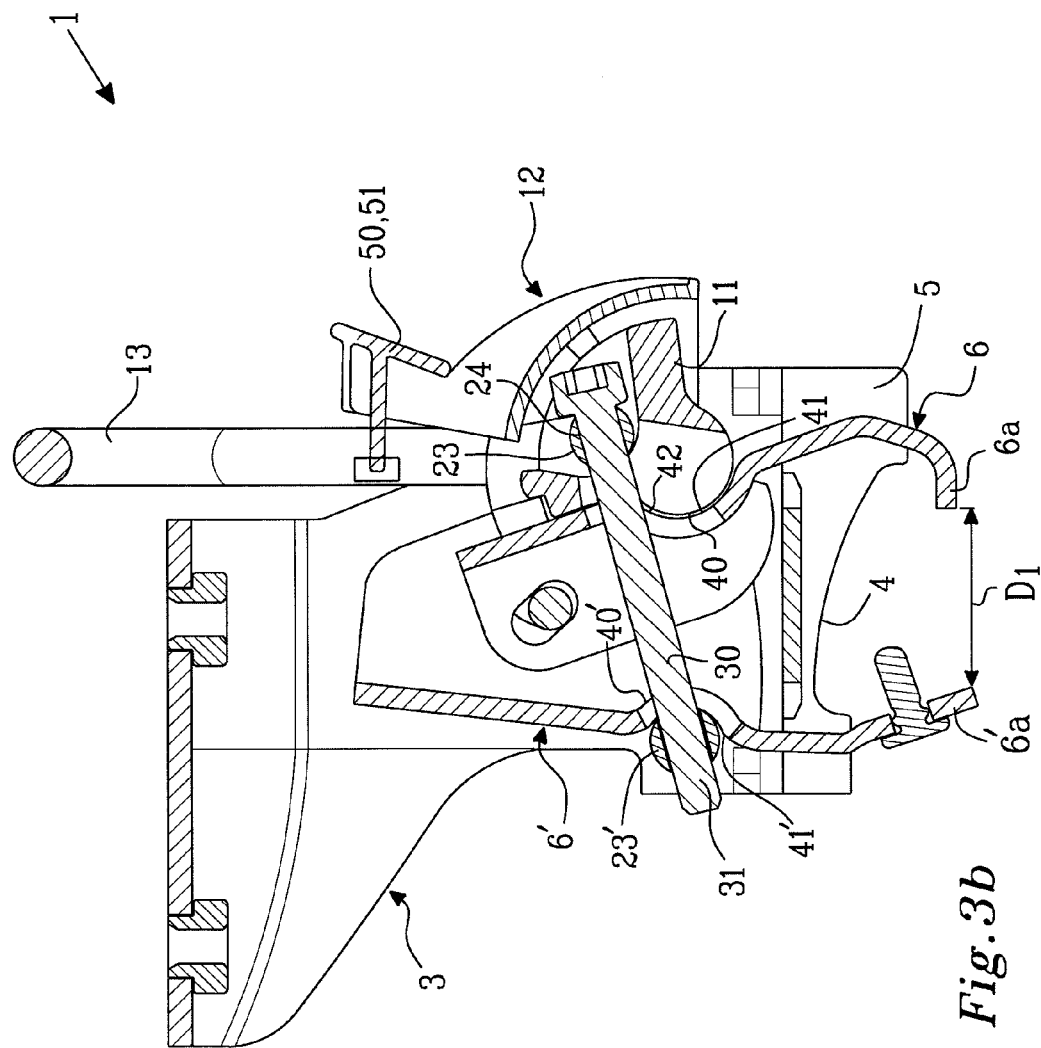
FIG. 3b shows the load carrier foot of FIG. 3a with a cross sectional view along the line B-B, the lever of the tensioning arrangement is positioned in the storage position and the cam member is in release position.

FIG. 3a shows a second embodiment of a load carrier foot 1 in a perspective, and FIG. 3b shows the load carrier foot of FIG. 3a in a cross sectional view from the side along B-B. With reference to FIGS. 3a-3b, the load carrier foot 1 comprises a support body 3 to which a load carrying bar (not shown) can be arranged. The support body 3 further comprises a support surface 4 adapted to rest against a first surface of a vehicle (not shown). The first surface of the vehicle can be a rail, or the roof, or any other suitable surface of the vehicle. The support surface 4 can be formed by an individual support member 5 as in the shown embodiment, or it can be integrally formed with the support body 3. A first bracket 6 is adapted to cooperate, e.g. grip about, a second surface of the vehicle, to retain the load carrier foot 1 to the vehicle. A support member, like the support member 5 is preferably manufactured from a tough but lenient material having some elasticity and which is slightly compressible. A suitable material is rubber or a rubber like material, a thermoplastic material such as a polypropylene, or polyethylene based material. It is intended to provide for an increased friction between a support body of the load carrier foot, and the vehicle, e.g. a rail or the vehicle roof. It is further intended to prevent the rail or the vehicle roof from damage through tear and wear.

A tensioning arrangement 10 is adapted to impart the first bracket 6 with a force so that a clamping force is provided between the first bracket 6 and the support surface 4. The load carrier foot 1 is thus retained to the vehicle in a clamping manner. The bracket 6 is pivotally attached to the support body 3.

The load carrier foot 1 shown in FIGS. 3a-3b further comprises a second bracket 6'. The second bracket 6' is pivotally connected to the support body 3, in the shown embodiment at the same pivot axis as the first bracket 6. The first bracket 6, the second bracket 6' and the tensioning arrangement 10 form a jaw like arrangement when seen as shown in FIG. 3b. The tensioning arrangement 10 together with the support surface 4 provides for a tree point clamping function. The tree point clamping function clamps about the vehicle, in the shown embodiment about a rail of the vehicle, at three points, and with three force components having different directions. Each point thus has a force component acting in a direction separate from the other two points during use.

The tensioning arrangement 10 comprises a cam member 11, a lever 13 connected to the cam member 11. A release mechanism 50, in the form of a release member 51 is integrally formed with the lever 13. It should be noted that the release member 51 and the lever 13 could be individual pieces connected to each other. The release mechanism 50 and the release member 51 is configured to release the imparted pressure by the cam member 11 as will be described below in greater detail. The lever 13 is formed by a bent rod 14 having a circular cross section but could be formed in a variety of different forms and shapes.

The cam member 11 and the lever 13 are pivotally connected to each other. A pin 23 with an aperture 24 is pivotally connected to the cam member 11. The aperture 24 of the pin 23 is adapted to receive a screw 30, making the screw 30 pivotally connected to the cam member 11. The cam member 11 is pivotally arranged to the first bracket 6 via screw 30 and configured to impart the first bracket 6 with a force upon rotation of the cam member 11 using the lever 13.

As is noted, the cam member 11 is arranged in a cavity 40 of the first bracket 6. The cavity 40 provides the cam member 11 with a ridge 42 to which the cam member 11 can use as cam member receiving surface and brace towards so as to impart the clamping force. The screw 30 extends through an aperture 41 arranged in the cavity 40 of the first bracket 6. In the shown embodiment, the aperture 41 extends across the ridge 42 so that the screw 30 can be displaced between different positions along the length of the aperture 41 of the first bracket 6 as will be described below.

The screw 30 comprises a threaded end 31 and a head 32. The threaded end 31 is adapted to be threadably engaged with a second pin 23', similar to the pin 23. Instead of being threadably engaged, the second pin 23' can be attached by other means such as by welding, pinching or the like. The second pin 23' is however pivotable with respect to the second bracket 6'. In the shown embodiment, the second pin 23' is not attached to the second bracket 6' but retained thereto by means of the screw 30.

The second bracket 6' also comprises a cavity 40' formed by a portion of the bracket 6'. The second pin 23' is arranged in the cavity 40'. The cavity 40' extends towards the first bracket 6, and thus forms a protrusion on the first bracket facing side of the second bracket 6'. An aperture 41 is arranged substantially in the cavity 40'. The screw 30 further extends through the aperture 41' arranged in the second bracket 6'. As is noticeable, the aperture 41' substantially extends across the cavity 40' permitting the screw 30 to pivot, or at least across what is to be considered as the bottom, of the cavity 40.

The load carrier foot 1 shown in FIGS. 3a-3b has two brackets 6, 6'. In the shown embodiment, each of the two brackets 6, 6' has a cavity 40, 40' comprising an aperture for receiving a portion of the tensioning arrangement 10. One cavity, in this case the cavity 40' of the second bracket 6', is arranged in working cooperation with one end of the screw, and the other cavity, in this case the cavity 40 of the first bracket 6 is in working cooperation with the cam member 11 of the tensioning arrangement 10.

In FIGS. 3a-3b the lever 13 is positioned in a storage position, or in a ready to mount position, and the cam member 11 is in a released position. The load carrier foot 1 is ready to be mounted to a rail of a vehicle, the brackets 6, 6' are "opened" in the sense that the distance between the ends 6a, 6'a of the brackets 6, 6' are separated a distance D1, enough for the load carrier foot 1 to be mounted to the rail of the vehicle in an easy manner. The cam member 11 is intended to press or brace against the first bracket 6 to impart the clamping force and operates as an eccentric in terms of that the rotational motion of the lever 13 is transferred to a displacement of the first bracket 6 towards the second bracket 6', i.e. a pivoting translation of the first bracket 6 with respect to the second bracket 6' is achieved. As the tensioning arrangement in the shown embodiment, is arranged to operate on the first and the second brackets 6, 6", the first and the second brackets 6, 6' are both pressed against each other as both of them are pivotally attached to the support body 3.

Figure 4:
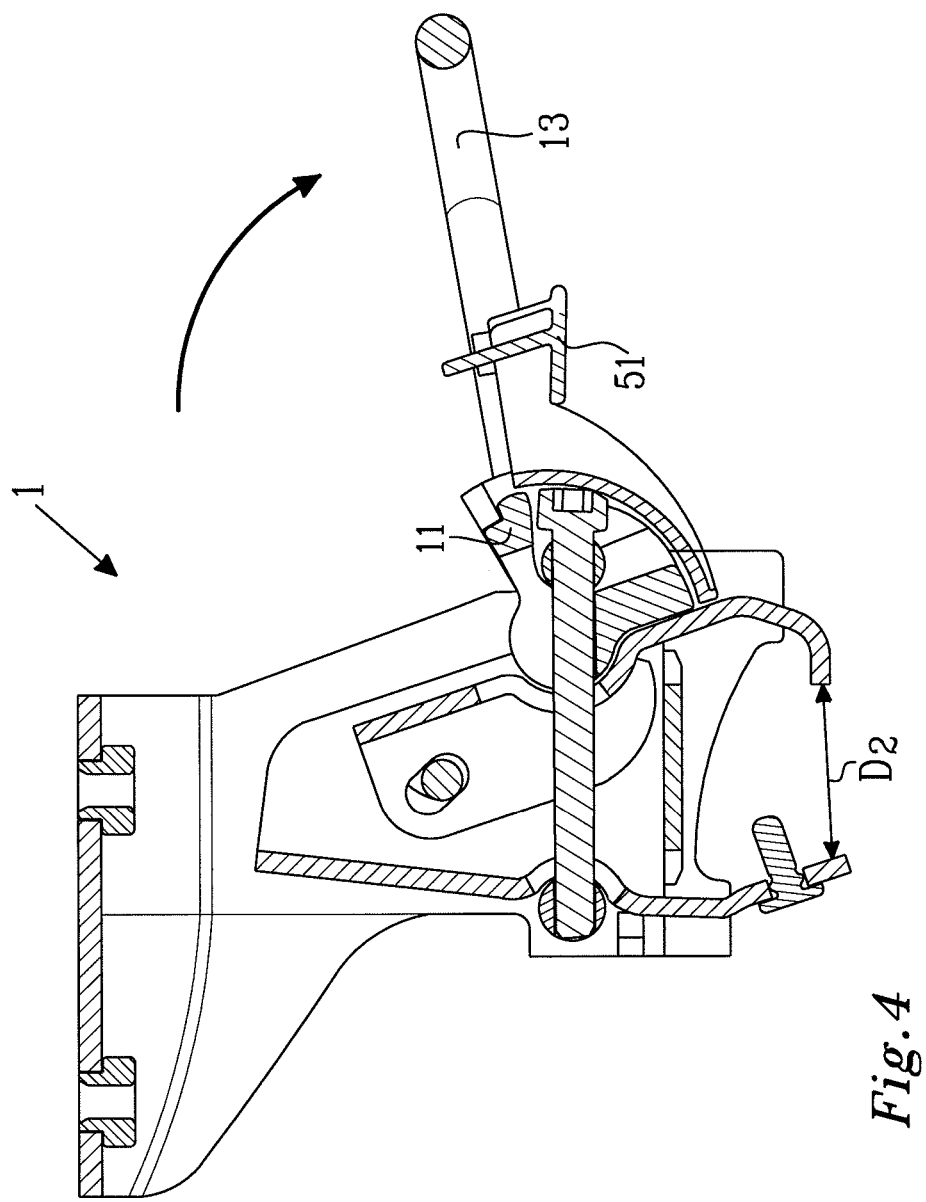
FIG. 4 shows the load carrier foot of FIG. 3b, the lever of the tensioning arrangement is positioned in the tightened position and the cam member is in the tightened position.

FIG. 4 shows the load carrier foot 1 of FIG. 3 but with the lever 13 positioned in a tightened position. The lever 13 has been pivoted by a user substantially downwards as indicated by the arrow. When the lever 13 is pivoted, the cam member 11 pivots with the lever 13 so that the cam member 11 imparts a force to the first bracket 6 acting to decrease the distance between the first and the second brackets 6, 6' so as to retain the load carrier foot 1 to the rail of the vehicle. A portion of the lever 13 engages a portion of the cam member 11 so that the cam member 11 is pushed, or pulled, by the lever 13 during pivoting. The distance D2 is thus <D1 at this stage. The lever 13 and the cam member 11 have the same kind of grooves and protrusions as described with respect to FIGS. 2a-2b. When the user has pulled the lever 13 downwards and the cam member 11 has tightened the brackets 6, 6' towards each other, the user can return the lever 13 to the storage position as shown in FIGS. 3a-3b. Notice however that the cam member 11 remains in a tightened position. As is under stood from FIG. 4, the release member 51 pivots with the lever 13 and the cam member 11, although being a separate component with respect to the cam member 11, and optionally in an embodiment a separate component with respect to the lever 13. In an embodiment, the release member 51 can be configured to stay in the upraised position, as shown in FIG. 3b although the lever 13 is pivoted as shown in FIG. 4.

Figure 5:
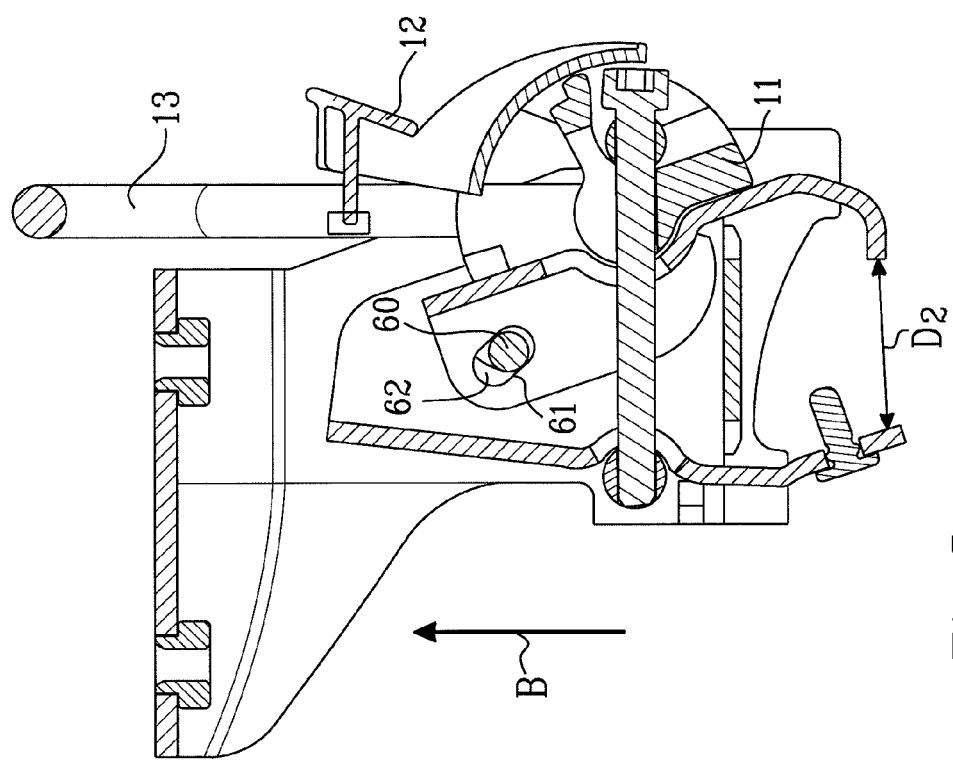
FIG. 5 shows the load carrier foot of FIG. 4, the lever of the tensioning arrangement is returned to the storage position and the cam member is in a tightened position.

FIG. 5 shows the cam member 11 in a tightened position and the lever 13 in a storage position. The release member 51 returns to the storage position together with the lever 13.

Figure 6:
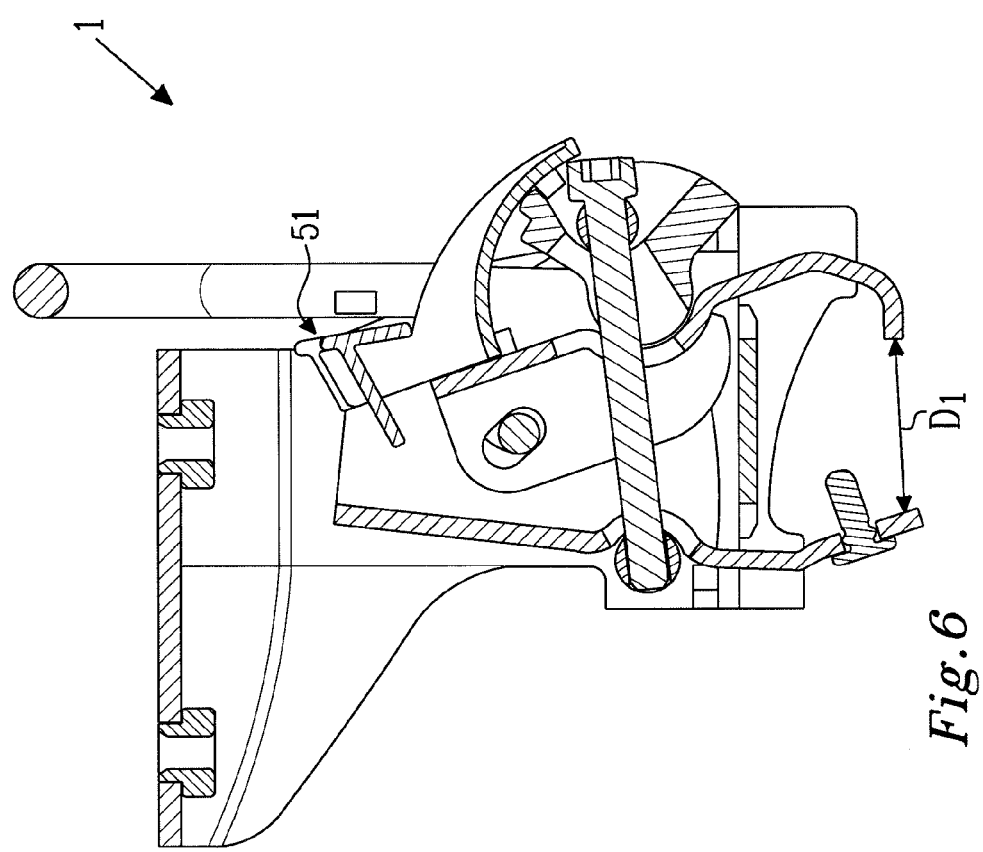
FIG. 6 shows the load carrier foot of FIG. 3b, the lever of the tensioning arrangement is positioned in the storage position and the cam member is released from the tightened position.

FIG. 6 shows the load carrier foot 1 with a cross sectional view. By pressing the release member 51 in a direction opposite to the pivotal motion that the cam member 11 was displaced with when pressing the lever 13 downwards, the clamping force that the cam member 11 imparted between the first and the second brackets 6, 6' is released. In FIG. 6 the release member 51 has been pivoted in a counter clock-wise direction. As is noticeable, the cam member 11 is pivoted counter clock-wise upon which the distance between the ends 6a, 6'a of the first and the second brackets 6, 6' is returned to the distance D1. The load carrier foot 1 can now easily be dismounted from the vehicle.

The lever 13 can in an embodiment comprise a release mechanism, in the form of an integrally formed release member, or a release member can be attached to the lever 13 and/or the cam member 11.

Figure 7:
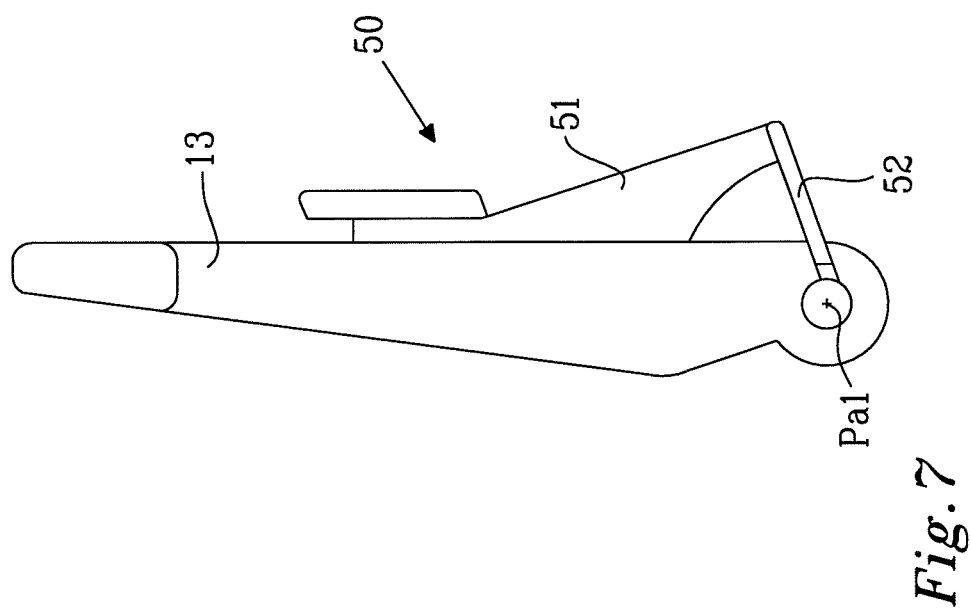
FIG. 7 shows a lever comprising a release member in greater detail.

FIG. 7 shows a lever 13 comprising an integrally formed release mechanism 50. The release mechanism is formed by with the lever 13 integrally formed release member 51. The lever with the release member 51 is manufactured by form molding a plastic material such as polystyrene, polyethylene, or polypropylene or mixtures thereof. The Release member 51 is connected to the lever 13 via a bridge section 52 which due to the selected material and the dimensions can be made somewhat flexible. The flexible bridge section 52 permits the release member 51 to be pivoted a distance with respect to the lever 13 enough to displace the cam member 11 from its tightened position so that the clamping force between the brackets can be released or at least reduced. An advantage of having a release mechanism 50 which is separated from the lever 13, as shown in FIGS. 3a-6 for example is that it is very intuitive for the user how to operate the tensioning arrangement of the load carrier foot 1. The pivot axis Pa1 is further indicated in FIG. 7 about which the lever 13 and the release member 51 is adapted to pivot.

The function and operation of the load carrier foot 1 shown and described with reference to the FIGS. 1a-2b operates using the same principal as the load carrier foot 1 shown and described with reference to FIGS. 3a-6. A difference is however that the embodiment shown in FIGS. 3a-6 has a release member which can be operated separately from the lever 13.

Figure 8A:
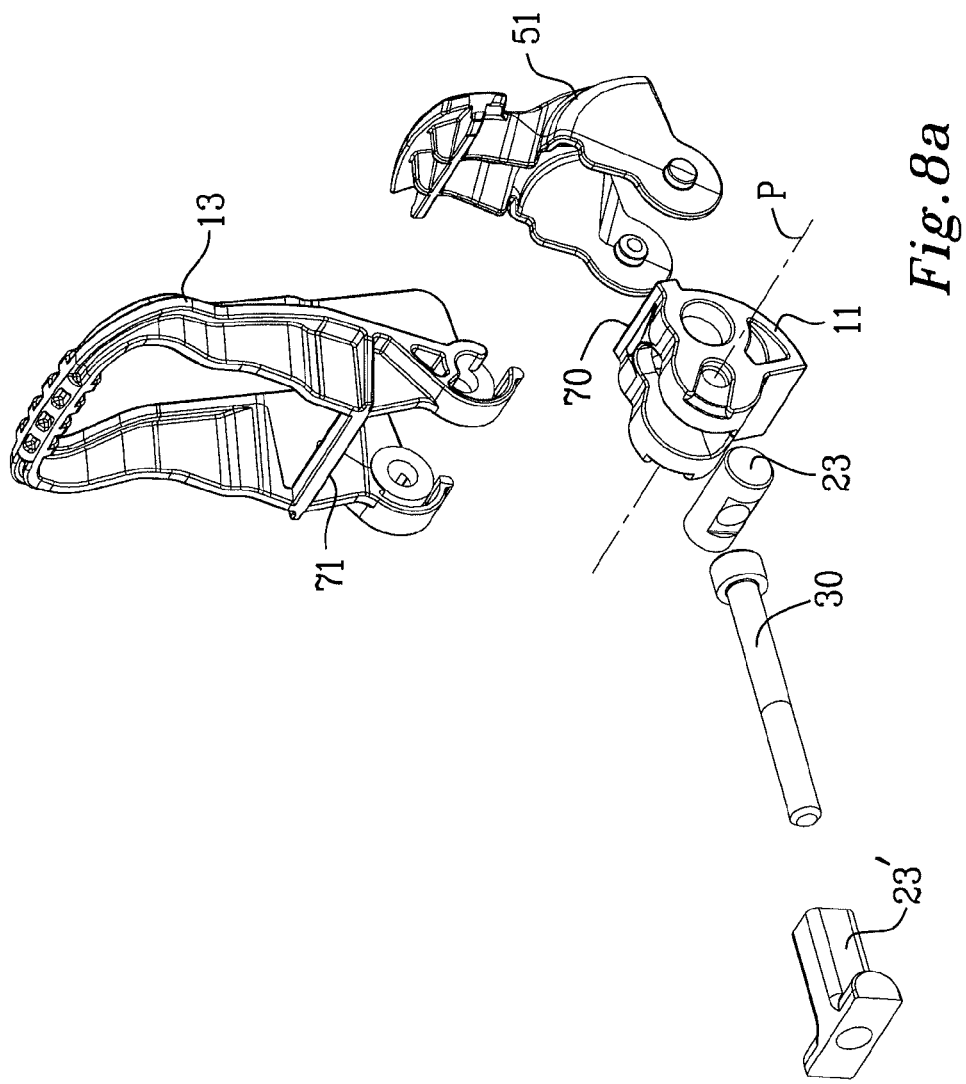
FIG. 8a shows an alternative tensioning arrangement which can be used with all the embodiments of the load carrier foot described herein.

FIG. 8a shows an alternative tensioning arrangement 10 which can be used with the load carrier foot 1 described herein. FIG. 8a shows a cam member 11, a lever 13, a release member 51, a screw 30, a pin 23 adapted to retain the screw 30 to the cam member 11, and a second pin 23' to anchor the screw 30 to the second bracket 6' (not shown). The lever 13, the cam member 11 and the release member 51 are pivotally connected along a pivot axis P indicated in FIG. 8 with dashed lines, corresponding to the pivot axis Pa1 shown in FIG. 2a. As is noticeable, the cam member 11 comprises a ledge 70 extending parallel with the pivot axis P and adapted to cooperate with a bar 71 on the lever 13. When the lever 13 is pivoted downwards, in the same manner as indicated in FIG. 4 with the arrow, the bar 71 engages the ledge 70 of the cam member 11 and pivots the cam member 11 to a tightened position. As the bar 71 of the lever 13 only engages the ledge 70 of the cam member 11 on one side thereof, the lever 13 can be returned to a storage position without the cam member 11 is untightened, i.e. without the cam member 11 follows the lever 13 back to a storage position, or release position.

Figure 8B:
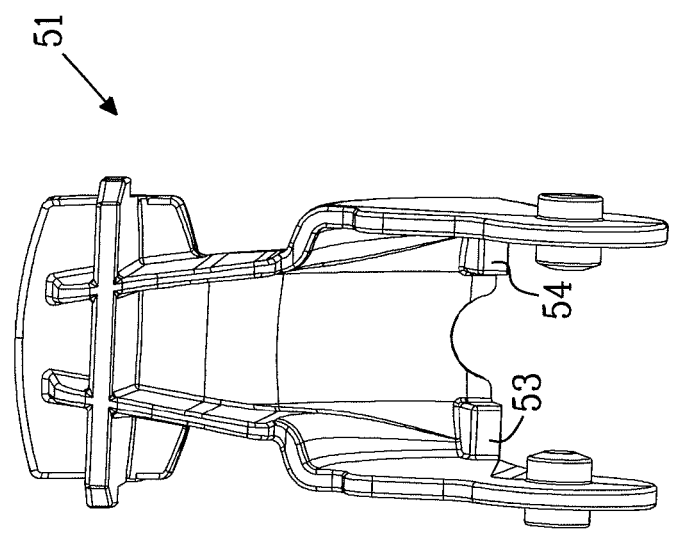
FIG. 8b shows the release member of FIG. 8a in greater detail.

FIG. 8b shows the release member 51 in greater detail, and with a view towards the cam member 11 facing surface. The release member 51 comprises two protrusions 53, 54 adapted to cooperate with the ledge 70 on the cam member 11. More specifically are they adapted to cooperate with the underside of the ledge 70 of the cam member 11 so that when the release member 51 is pivoted in a direction counter wise to the arrow shown in FIG. 4, the release member 51 disengages the cam member 11 from the first bracket (not shown in FIG. 8a), and from a tightened position and displaces it to a release position, in principle shown in FIG. 6.

Figure 9:
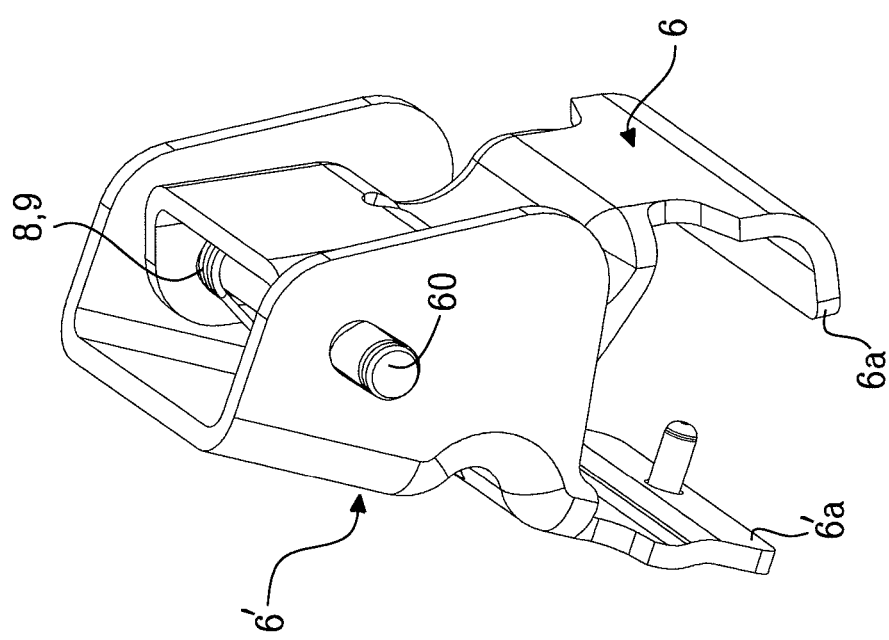
FIG. 9 shows the first and the second brackets of the load carrier foot of FIGS. 3a-6 in greater detail.

FIG. 9 shows the first and the second brackets 6, 6' in greater detail. FIG. 9 shows the connection axle 60 and a biasing member 8 in the form of a spring 9, in this case a helical spring. The first bracket 6 and the second bracket 6' form a jaw like arrangement with a gap when seen as shown in FIG. 9. The biasing member 8 is adapted to bias the first and the second brackets 6, 6' away from each other, i.e. to keep the gap formed between the first and the second brackets 6, 6' open. Each of the brackets 6, 6' comprises an end 6a, 6'a defining the gap between the first and the second brackets 6, 6'.

Figure 10:
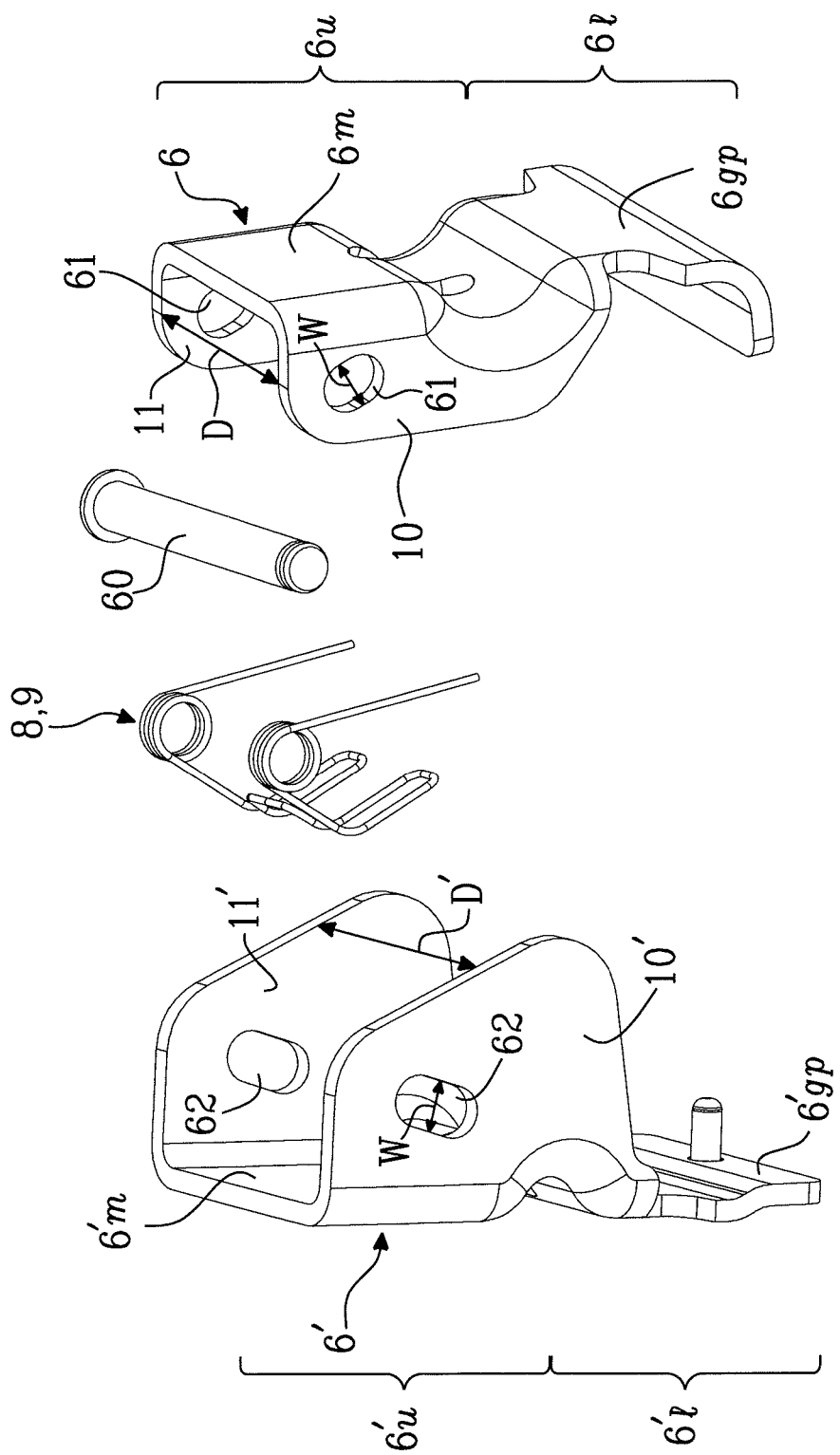
FIG. 10 shows the first and the second brackets of the load carrier foot of FIG. 9 in exploded view.

FIG. 10 shows FIG. 9 in an exploded view. As is noticeable, the first and the second brackets 6, 6' has an upper and a lower portion 6u, 61, 6'u, 6'1. The upper portions 6u, 6'u of the first and the second brackets 6, 6' each comprises connection flanges 10, 11, 10', 11'. The connection flanges 10, 11, 10', 11' extends substantially perpendicular out from a main portion 6m, 6'm of the first and the second brackets 6, 6'. The main portion 6m and the two connection flanges 10, 11 of the first bracket 6 thus form a U-like section adapted to mesh with the corresponding U-like section of the opposing second bracket 6' to provide rigidity to the first and the second brackets 6, 6' and the load carrier foot 1. The main portion of the first and the second brackets 6, 6' transcends to a grip portion 6gp, 6'gp, which is that part of the first and the second brackets which is intended to grasp about a portion of the vehicle. The grip portions 6gp, 6'gp can have different configurations as shown in the figure, or have the same configuration. The load carrier foot 1 thus has sections with overlapping material layers which are believed to structurally support the load carrier foot 1.

Each of the connection flanges 10, 11, 10', 11' of the first and the second brackets 6, 6' comprises an elongated aperture 61, 62, also referred to a connection aperture. The elongated apertures 61, 62 are adapted to receive the connection axle 60 and pivot about the connection axle 60 so that the load carrier foot 1 is easy to mount and dismount. Further, the elongation of the elongated apertures 61, 62 permits the connection axle 60 to be displaced a distance defined by the elongation of the elongated apertures 61, 62. As is noticed the elongated apertures 61, 62 have a width W which is slightly larger than the diameter of the connection axle 60. The width W is large enough to permit the connection axle 7 to slide inside of the elongated apertures 61, 62, but not too large so that unnecessary play is formed between the connection axle 60 and the sides of the elongated apertures 61, 62. The length of the elongated apertures 61 of the first bracket 6 is slightly shorter than the elongation of the length of the elongated aperture 62 of the second bracket 6'. A suitable length of an elongated aperture 61, 62 is between 5-50 mm, optionally at least 1.5 times the length of the diameter of the connection axle. One or both of the first and the second brackets 6, 6' can be connected using an elongated aperture having an elongated extension as described above.

The elongated apertures 61, 62 are further angled with respect to each other substantially with an angle difference of about 90 degrees, but preferably from 40-100 degrees. This will pull the first and the second bracket upwards as indicated with the arrow B in FIG. 5, when the tensioning arrangement 10 is used. As a result, the load carrier foot 1 is readily retained e.g. to a rail of the vehicle.

Figure 11:
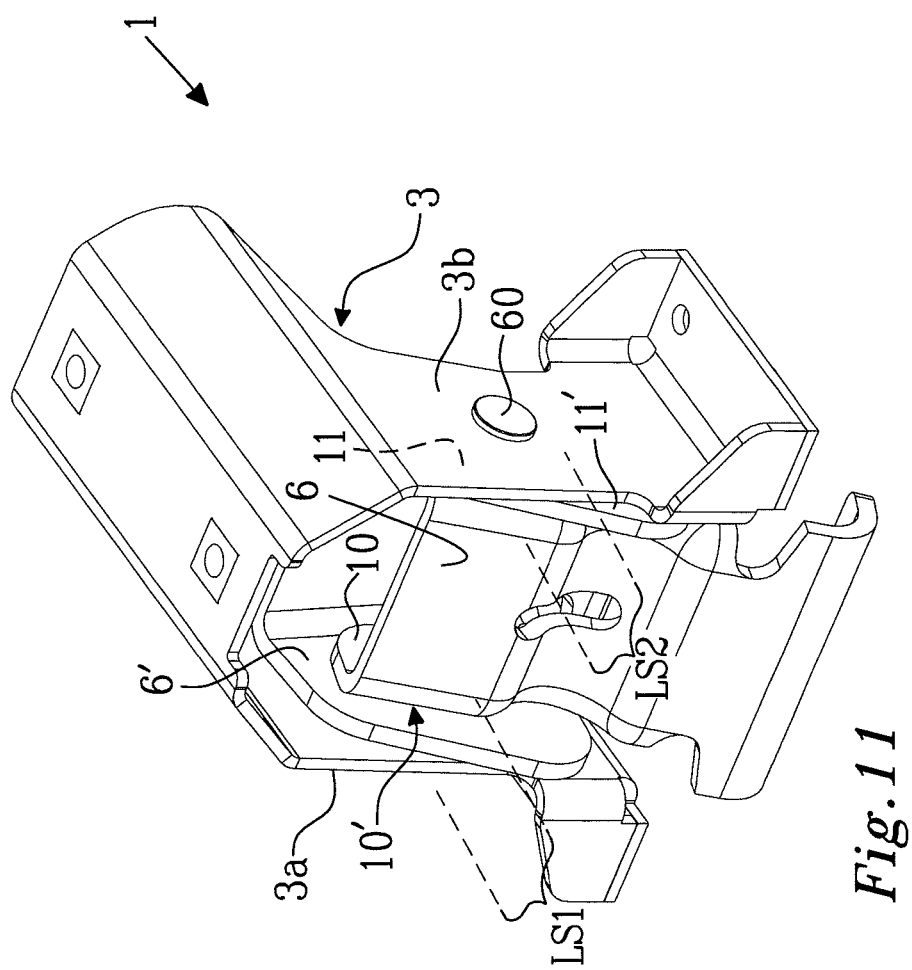
FIG. 11 shows the first and the second brackets of the load carrier foot of FIG. 9 and the support body of the load carrier foot being arranged in a layered structure.

FIG. 11 shows portions of the load carrier foot 1. FIG. 11 shows the support body 3, the connection axle 60 and the first and the second bracket 6, 6'. From left to right, the layers formed by each component is the support body 3, a first connection flange 10' of the second bracket 6', a first connection flange 10 of the first bracket 6, between the two connection flanges of the first bracket 6 is the biasing member 8 positioned in this case the spring 9 (not shown), thereafter the second connection flange 11 of the first bracket 6, the second connection flange 11' of the second bracket 6' and finally again the support body 3.

As can be noticeable in FIG. 11, the first and the second brackets 6, 6', and especially due to the connection flanges 10, 11, 10', 11' of the first and the second brackets 6, 6', forms layered sections, or sandwich sections. The load carrier foot 1 has a first and a second layered section LS1, LS2, each section is formed by three components. In a layered section, the support body 3, the first bracket 6 and the second bracket 6' are positioned adjacent each other in a sandwich structure. It is possible that a washer may be positioned between each material layer, it is still considered to be a layered section. The layered sections LS1, LS2 give the load carrier foot 1 enhanced stability and rigidity which is very important, especially during crash scenarios. It is believed without being bound by theory that the individual components in the layered sections support each other. Further, by using a common connection axle, such as the connection axle 60, an even better stability is provided to the load carrier foot 1.

In the embodiment shown in FIG. 11, the support body 3 has a first and a second side 3a, 3b. The support body 3 of the load carrier foot 1 has a U-shaped form, with the two sides 3a, 3b forming vertical walls on which the first and the second bracket 6, 6' are positioned to brace against. The first layered section LS1 is defined by the first side 3a of the support body 3 positioned adjacent the first connection flange 10 of the second bracket 6' which in turn is positioned adjacent the first connection flange 10 of the first bracket 6. In a similar manner, the second layered section LS2 is defined by the second connection flange 11 of the first bracket 6 which in turn is positioned adjacent the second connection flange 11' of the second bracket 6' which in turn is positioned adjacent the second side 3b of the support body 3. In the just mentioned embodiment, two layered sections with three layers are formed. In the layered section described herein, one layer is stationary and two layers are displaceable with respect to each other. After the load carrier foot 1 has been positioned on the vehicle roof, the support body 3 of the load carrier foot 1 is stationary and only the first and the second brackets are displaceable enough to tighten the brackets towards each other.

It should be noted that even though the first and the second brackets 6, 6' has two connection flanges 10, 11, 10', 11', the load carrier foot 1 can be provided with a first and a second bracket having only one connection flange, thus forming only one layered section.

In an embodiment, the connection flanges do not necessarily be positioned adjacent a side of the support body, as shown in FIG. 11. It may suffice that the connection flanges of the brackets are positioned adjacent each other, or that a connection flange of one bracket is positioned adjacent one side of the support body. In the just mentioned embodiment, a layered section with two layers is formed.

Figure 12:
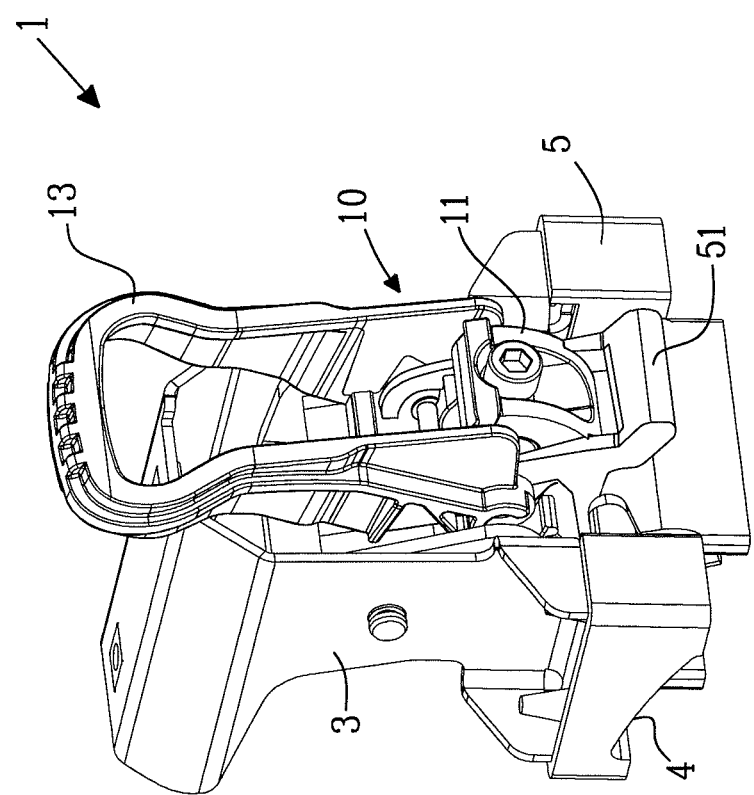
FIG. 12 shows a load carrier foot having a tensioning arrangement with a cam member lock mechanism.

FIG. 12 shows a load carrier foot 1 similar to the load carrier foot described above. The load carrier foot 1 has a tensioning arrangement 10 comprising a cam member lock mechanism. FIG. 12 shows, the support body 3, the cam member 11, the lever 13 and the release member 51. A support member 5, as described above, is positioned underneath the support body 3 to provide for a support surface 4. As is noticeable, the release member 11 is positioned to extend in a direction substantially opposite to the lever 13. FIG. 12 shows the load carrier foot 1 when the cam member 11 is in a tightened position, i.e. the load carrier foot 1 is intended to be mounted to a rail of a vehicle and tightened thereto.

Figure 13:
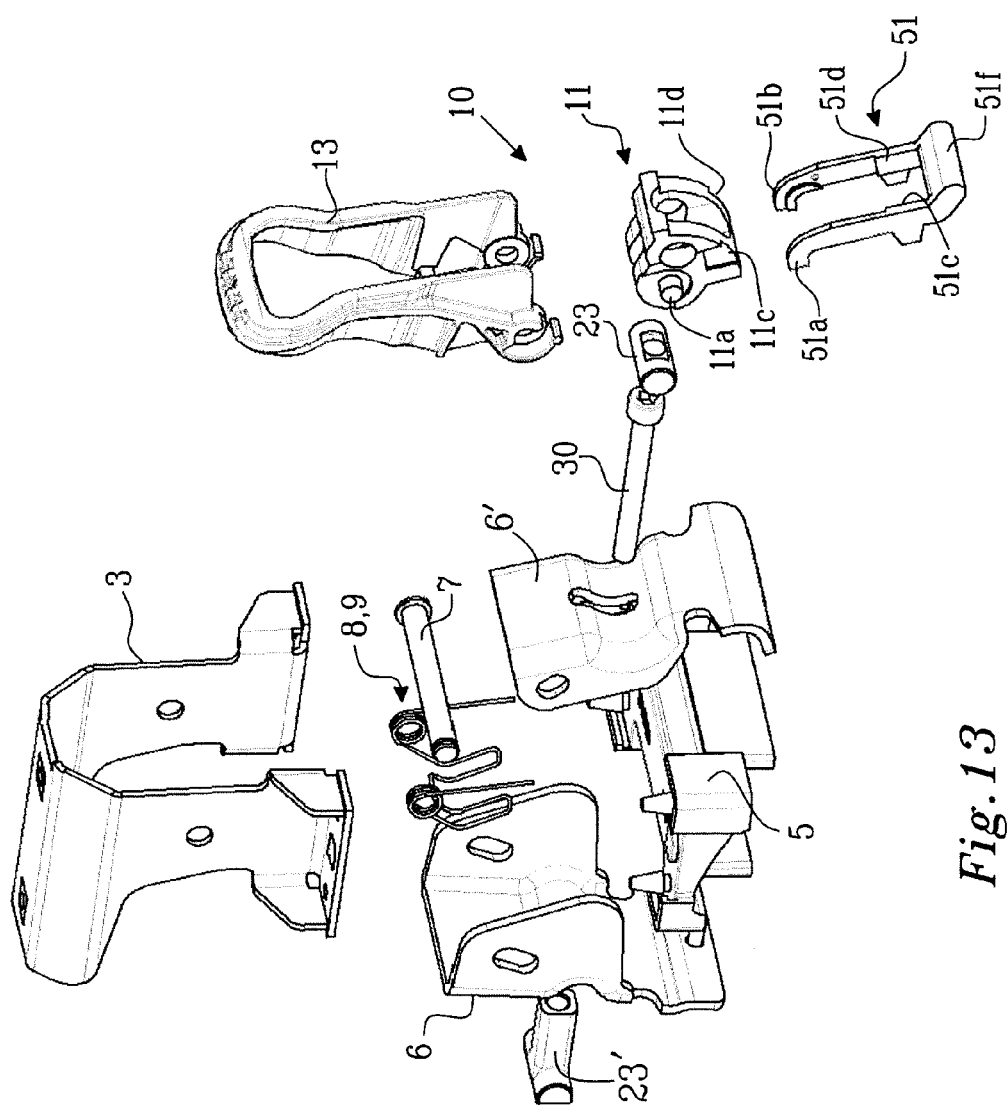
FIG. 13 shows the load carrier foot of FIG. 12 in an exploded view.

FIG. 13 shows the load carrier foot 1 of FIG. 12 in exploded view. FIG. 13 shows the support body 3, the support member 5, the first and the second brackets 6, 6', the connection axle 7, the biasing member 8, in this case a spring 9, the cam member 11, the lever 13, the screw 30 with the pins 23, 23' and the release member 51.

The release member 51 comprises a first and a second arm 51a, 5b adapted to grasp about a portion of the cam member, in this case axle portions 11a on which the lever 13 is connected to. A handle portion 51f, is arranged to bridge between the first and the second arms 51a, 51 b. The press member can be used by a user to press the release member 51 in an upwardly direction, to release the cam member 11 if the load carrier foot 1 is to be detached from the vehicle. The release member 51 is thus displaceably arranged to the cam member and indirectly to the lever 13. The first and the second arm 51a, 51b comprises protruding portions 51c, 51d having slightly larger thickness than the remaining portions of the first and the second arms 51a, 5b. The cam member 11 is provided with grooves 11c, 11d adapted to receive the protruding portions 51c, 51d of the first and the second arm 51a, 51 b as will be described below. Hence, the release member 51 is adapted to cooperate with the cam member 11 to prevent the cam member 11 from being accidentally unlocked, or released, from the tightened position.

FIG. 14a shows the load carrier foot of FIG. 12 in a cross section view. The lever 13 has been pivoted to tighten the cam member 11, and thereafter returned to the storage position. The release member 51 is in an unlocked position. When the release member 51 is displaced, or pushed, in a direction towards the lever 13 as indicated by the arrow in FIG. 14a, the protruding portions 51c, 51d of the first and the second arms 51a, 51b of the release member 51 engages the grooves 11c, 11d of the cam member 11 (shown in FIG. 13). To displace the release member 11 back to the unlocked position, the user simply pulls the handle portion 51f in a direction opposite to the arrow shown in FIG. 14a.

FIG. 14b shows the load carrier foot of FIG. 12 in a cross section view but with the release member 51 is in a locked position. As is noticeable, the first and the second arms 51a, 51b of the release member 51 is bracing themselves against the first bracket 6, preventing the release arm 51, and thus the cam member 11 from being pivoted to a release position. A displaceable release member, such as the release member 51, can be effectively used as a cam member lock mechanism, by being displaced between an unlocked position and a lock position. In the lock position, the release member 51 engages the cam member 11 and a portion of the first bracket 6, or alternatively the support body 3, to prevent the cam member 11 from pivoting to a release position when the cam member 11 is in a tightened position.

Figure 15:
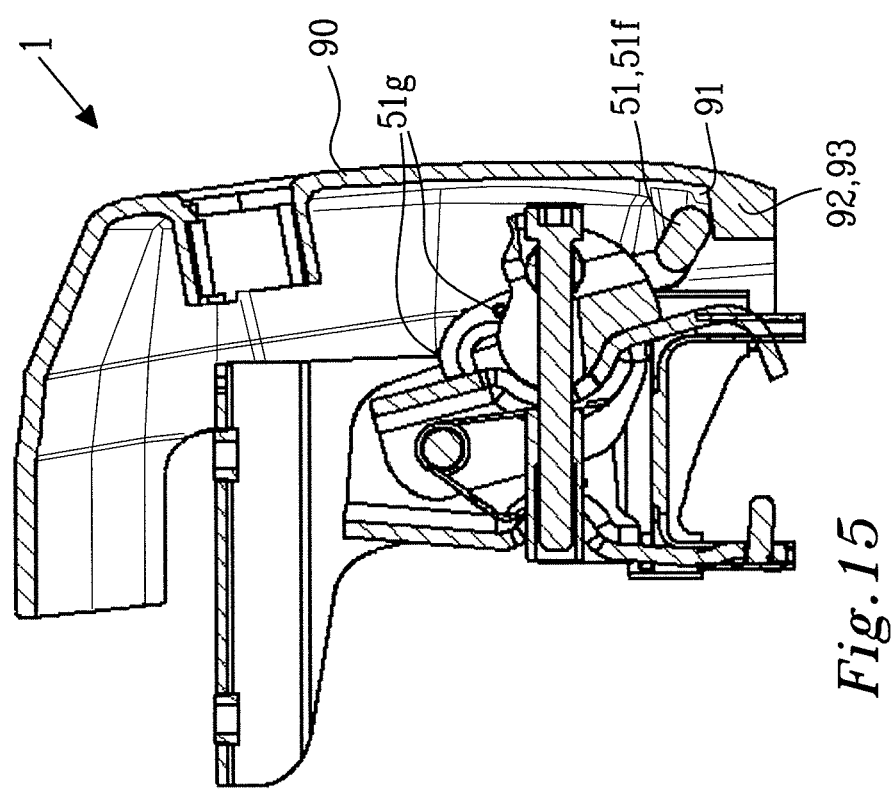
FIG. 15 shows the load carrier foot of FIG. 12 in a cross sectional view and with the release member in a locked position, and with a protective lid covering the tensioning arrangement.

FIG. 15 shows the load carrier foot 1 of FIG. 12. The load carrier foot 1 can be provided with a protective lid 90, such as the lid 90 shown in FIG. 15. One aspect of having a displaceable release member 51 is that the release member 51 can be configured to cooperate with the inner side 91 of the protective lid 90. The inner side 91 of the lid 90 is in the shown embodiment adapted to be prevented from being properly attached to the load carrier foot 1, or closed to the load carrier foot 1, unless the release member 11 is in a locked position, or at least that the cam ember 11 is in a tightened position. As is noticeable, the inner side 91 of the lid 90 comprises a portion 92, in the form of a protruding member 93, which is positioned to prevent the release member 51 from being displaced from the locked position. The protruding member 93 of the lid engages the handle portion 51f of the release member.

Small protrusions 51g arranged in the inner sides of the first and the second arms 51a, 5b of the release member 51 engages a portion of the cam member 11 to prevent the release member 11 from being displaced form the locked position to the unlocked position. The small protrusions 51g uses a snap on function with the cam member 11. The snap on function of the release member 11 can be used alone or in combination with the protective lid 90 as shown in FIG. 15.

The first and the second brackets 6, 6' can be formed by sheet steel, such as pressed sheet steel. The support body 3 of the load carrier foot 1 can also be formed from sheet steel. Composites and reinforced plastic material may be used as alternative or in addition to sheet steel.

The invention claimed is:

1. A load carrier foot, comprising:
   a support body comprising a support surface configured to rest against a first surface of a vehicle;
   a bracket configured to grip about a second surface of said vehicle; and
   a tensioning arrangement configured to impart a clamping force to said bracket to retain said load carrier foot to said vehicle, wherein said tensioning arrangement comprises a cam member configured upon pivoting of said cam member to impart said clamping force to said bracket,
   wherein said tensioning arrangement further comprises a lever in working cooperation with said cam member, wherein said lever is a separate component with respect to said cam member, and wherein said lever is configured to be operated by a user from a first position to a second position to pivot said cam member into a tightened position and to pivot back to said first position without pivoting said cam member from said tightened position.

2. The load carrier foot according to claim 1, wherein when said lever is displaced from said first position to said second position, said cam member is pivoted together with said lever.

3. The load carrier foot according to claim 2, wherein said lever comprises a bar or a protrusion configured to cooperate with a portion of said cam member.

4. The load carrier foot according to claim 1, wherein said cam member is configured to be pivoted when said lever is pivoted from a storage position to said tightened position.

5. The load carrier foot according to claim 4, wherein said first position is said storage position and said second position is said tightened position.

6. The load carrier foot according to claim 1, wherein said lever is pivotally attached to said cam member.

7. The load carrier foot according to claim 1, wherein said cam member is configured to pivot about a first pivot axis, and said lever is configured to pivot about said first pivot axis, wherein said lever extends in a radial direction with respect to said first pivot axis.

8. The load carrier foot according to claim 7, wherein said tensioning arrangement further comprises a release member configured to displace said cam member from a tightened position to a release position, wherein said release member is integrally formed with said lever or a separate member therefrom, wherein said release member is configured to pivot about the same pivot axis as said lever.

9. The load carrier foot according to claim 1, wherein said tensioning arrangement comprises a screw member pivotally connected to said support body or to a second bracket arranged to said load carrier foot, wherein said second bracket is pivotally connected to said support body.

10. The load carrier foot according to claim 9, wherein said screw extends through an aperture of said bracket, wherein said screw is pivotally connected to said cam member.

11. The load carrier foot according to claim 1, wherein said first bracket comprises a cam member receiving cavity or a ridge providing a cam member receiving surface on said first bracket.

12. The load carrier foot according to claim 1, wherein said lever is extendable between an extended position, in which said lever is operable, and a retracted storage position.

13. The load carrier foot according to claim 1, wherein said cam member operates as an eccentric or a knee joint.

14. The load carrier foot according to claim 13, wherein said cam member has a cam surface, said cam surface having a radial curvature or an eccentric curvature.

15. The load carrier foot according to claim 1, wherein said bracket is a first bracket, and wherein said load carrier foot comprises a second bracket, said second bracket being pivotally connected to said support body or to said first bracket.

16. The load carrier foot according to claim 15, wherein a biasing member is positioned between said first and said second brackets, said biasing member biasing said first and said second brackets apart.

17. A roof rack, comprising:
    a first and a second load carrier foot, each foot comprising:
        a support body comprising a support surface configured to rest against a first surface of a vehicle;
        a bracket configured to grip about a second surface of said vehicle; and
    a tensioning arrangement configured to impart a clamping force to said bracket to retain said load carrier foot to said vehicle, wherein said tensioning arrangement comprises a cam member configured upon pivoting of said cam member to impart said clamping force to said bracket,
        wherein said tensioning arrangement further comprises a lever in working cooperation with said cam member, wherein said lever is a separate component with respect to said cam member, and wherein said lever is configured to be operated by a user from a first position to a second position to pivot said cam member into a tightened position and to pivot back to said position without pivoting said cam member from said tightened position; and
    a load carrying bar extending between said first and said second load carrier foot.

* * * * *